(12) United States Patent
Huang

(10) Patent No.: US 9,880,660 B2
(45) Date of Patent: Jan. 30, 2018

(54) TOUCH DRIVING UNIT, TOUCH PANEL AND DISPLAY DEVICE

(71) Applicants: BOE TECHNOLOGY GROUP CO., LTD., Beijing (CN); ORDOS YUANSHENG OPTOELECTRONICS CO., LTD., Ordos (CN)

(72) Inventor: Fei Huang, Beijing (CN)

(73) Assignees: BOE TECHNOLOGY GROUP CO., LTD., Beijing (CN); ORDOS YUANSHENG OPTOELECTRONICS CO., LTD., Ordos (CN)

(*) Notice: Subject to any disclaimer, the term of this patent is extended or adjusted under 35 U.S.C. 154(b) by 53 days.

(21) Appl. No.: 15/131,631

(22) Filed: Apr. 18, 2016

(65) Prior Publication Data

US 2016/0378242 A1 Dec. 29, 2016

(30) Foreign Application Priority Data

Jun. 24, 2015 (CN) .......................... 2015 1 0355862

(51) Int. Cl.
  *G06F 3/041* (2006.01)
  *G09G 3/20* (2006.01)
  *G06F 3/044* (2006.01)

(52) U.S. Cl.
  CPC ............ *G06F 3/0416* (2013.01); *G06F 3/044* (2013.01); *G06F 3/0412* (2013.01); *G09G 3/2092* (2013.01); *G09G 2300/08* (2013.01); *G09G 2310/0267* (2013.01); *G09G 2310/0286* (2013.01); *G09G 2310/08* (2013.01)

(58) Field of Classification Search
  CPC .................................................... G06F 3/03547
  USPC .................................................... 345/173–178
  See application file for complete search history.

(56) References Cited

U.S. PATENT DOCUMENTS

| 9,703,413 | B2* | 7/2017 | Zhang | ................... G06F 3/0416 |
| 2014/0169518 | A1 | 6/2014 | Kong et al. | |
| 2016/0170525 | A1* | 6/2016 | Zhai | ........................ G06F 3/044 345/174 |
| 2016/0188091 | A1* | 6/2016 | Sun | ........................ G06F 3/0416 345/174 |

(Continued)

FOREIGN PATENT DOCUMENTS

| CN | 104503652 A | 4/2015 |
| CN | 104571710 A | 4/2015 |
| EP | 2743929 A1 | 6/2014 |

OTHER PUBLICATIONS

First Office Action regarding Chinese Application No. 201510355862.0, dated Jul. 3, 2017. Translation provided by Dragon Intellectual Property Law Firm.

*Primary Examiner* — Roy Rabindranath

(74) *Attorney, Agent, or Firm* — Harness, Dickey & Pierce, P.L.C.

(57) ABSTRACT

The present disclosure provides a touch driving unit, including a shift register module configured to generate a triggering signal, a grating module configured to generate a control signal in accordance with the triggering signal and control a signal from an output module, an amplification module configured to amplify the control signal, and the output module configured to output a signal from a touch signal end or a signal from a common electrode signal end.

20 Claims, 3 Drawing Sheets

(56) References Cited

U.S. PATENT DOCUMENTS

2016/0370918 A1    12/2016   Huang et al.
2016/0370928 A1    12/2016   Hao et al.

\* cited by examiner

TOUCH DRIVING UNIT, TOUCH PANEL AND DISPLAY DEVICE

CROSS-REFERENCE TO RELATED APPLICATION

The present application claims a priority of the Chinese patent application No. 201510355862.0 filed on Jun. 24, 2015, which is incorporated herein by reference in its entirety.

TECHNICAL FIELD

The present disclosure relates to the field of display technology, in particular to a touch driving unit, a touch panel and a display device.

BACKGROUND

Along with the development of the electronic technology, more and more display devices have been operated by a user in a human-machine interaction mode. Currently, for the human-machine interaction mode, a mechanical button mode has been replaced with a touch sensing mode. Taking a touch panel as an example, the touch panel includes a plurality of scanning electrodes and sensing electrodes. In the touch sensing mode, when the touch panel is touched by the user, a capacitance between the scanning electrode and the sensing electrode will be changed at a point where the touch has been made, and a sensing signal in the sensing electrode will be changed accordingly. A position of the point where the touch has been made may be acquired by analyzing the sensing signal, so as to achieve the human-machine interaction between the user and the display device through the touch panel installed on the display device. The touch panel installed on the display device includes multiple levels of touch driving units each configured to provide a scanning signal to the scanning electrode.

In the related art, the touch driving unit includes a shift register module, a phase reversal control module, a gating module, an amplification module and an output module. The phase reversal control module is configured to generate a phase reversal control signal in accordance with a received triggering signal. The phase reversal control signal is then inputted into the gating module, so as to control the gating module to generate a signal for controlling the output of the output module. However, these modules each consist of a plurality of transistors, so the touch driving unit is of a relatively complex structure, and the resultant power consumption is relatively large.

SUMMARY

An object of the present disclosure is to provide a touch driving unit, a touch panel and a display device, so as to simplify the structure of the touch driving unit and reduce the power consumption thereof.

In one aspect, the present disclosure provides in some embodiments a touch driving unit, including: a shift register module, an input end of which is connected to a first clock signal end and an input signal end, an output end of which is connected to a gating module, and which is configured to generate a triggering signal; the gating module, an input end of which is connected to a second clock signal end, a touch sampling signal end, a common electrode enabling signal end, a low level end and the shift register module, an output end of which is connected to an amplification module, and which is configured to generate a control signal in accordance with the triggering signal so as to control a signal outputted from an output module; the amplification module, an input end of which is connected to the gating module, an output end of which is connected to the output module, and which is configured to amplify the control signal; and the output module, an input end of which is connected to a touch signal end and a common electrode signal end, an output end of which is connected to an output end of the touch driving unit, and which is configured to output a signal from the touch signal end or a signal from the common electrode signal end.

In another aspect, the present disclosure provides in some embodiments a touch panel including multiple levels of the above-mentioned touch driving units.

In yet another aspect, the present disclosure provides in some embodiments a display device including the above-mentioned touch panel.

According to the touch driving unit, the touch panel and the display device in the embodiments of the present disclosure, the touch driving unit includes the shift register module, the grating module, the amplification module and the output module. As compared with the related art where the touch driving unit further includes a phase reversal control module, the touch driving unit in the embodiments of the present disclosure does not include any phase reversal control module, and the grating module may generate the control signal directly in accordance with the triggering signal generated by the shift register module, so as to control the output of the output module. As a result, it is able to simplify the structure of the touch driving unit and reduce the power consumption thereof while ensuring a normal operation of the touch driving unit.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
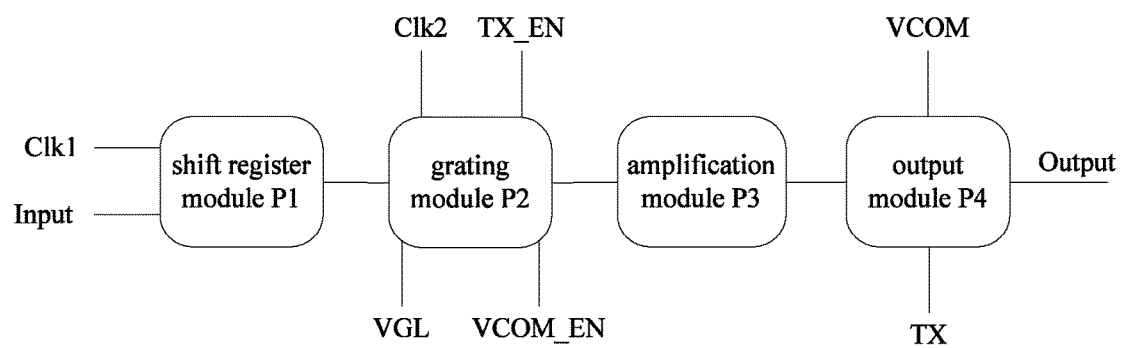
FIG. 1 is a schematic view showing a touch driving unit according to at least one embodiment of the present disclosure.

Referring to FIG. 1, a touch driving unit in some embodiments of the present disclosure includes a shift register module P1, a gating module P2, an amplification module P3 and an output module P4. An input end of the shift register module P1 is connected to a first clock signal end Clk1 and an input signal end Input, an output end of the shift register module P1 is connected to the grating module P2, and the shift register module P1 is configured to generate a triggering signal. An input end of the gating module P2 is connected to a second clock signal end Clk2, a touch sampling signal end TX_EN, a common electrode enabling signal end VCOM_EN, a low level end VGL and the shift register module P1, an output end of the gating module P2 is connected to the amplification module P3, and the gating module P2 is configured to generate a control signal in accordance with the triggering signal, so as to control a signal outputted by the output module P4. An input end of the amplification module P3 is connected to the gating module P2, an output end of the amplification module P3 is connected to the output module P4, and the amplification module P3 is configured to amplify the control signal. An input end of the output module P4 is connected to a touch signal end TX and a common electrode signal end VCOM, an output end of the output module P4 is connected to an output end Output of the touch driving unit, and the output module P4 is configured to output a signal from the touch signal end Tx or a signal from the common electrode signal end VCOM.

Figure 2:
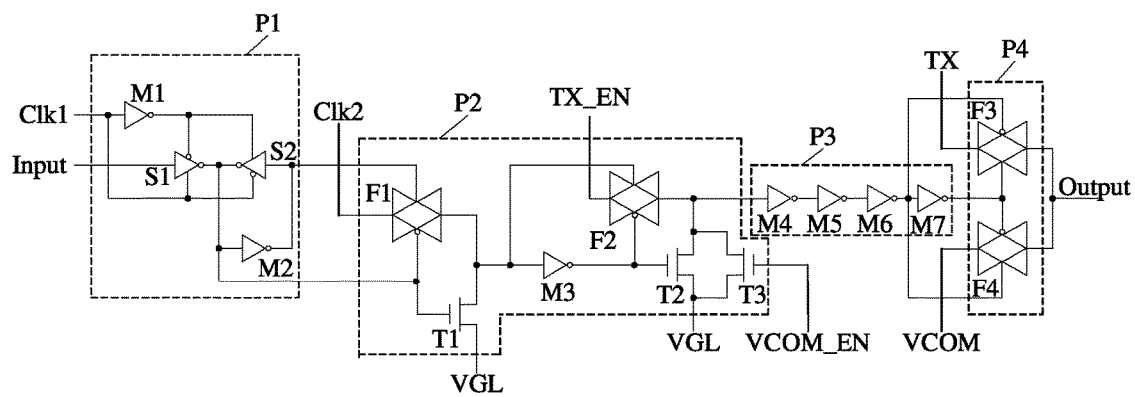
FIG. 2 is another schematic view showing the touch driving unit according to at least one embodiment of the present disclosure.

According to the embodiments of the present disclosure, the touch driving unit includes the shift register module P1, the gating module P2, the amplification module P3 and the output module P4. As compared with the related art where the touch driving unit further includes a phase reversal control module, the touch driving unit in the embodiments of the present disclosure does not include any phase reversal control module, and the grating module P2 may generate the control signal directly in accordance with the triggering signal generated by the shift register module, so as to control the output of the output module P4. As a result, it is able to simplify the structure of the touch driving unit and reduce the power consumption thereof while ensuring a normal operation of the touch driving unit. Referring to FIG. 2, the structures of the shift register module P1, the gating module P2, the amplification module P3 and the output module P4 in FIG. 1 will be described hereinafter in further details.

The shift register module P1 includes a first phase inverter M1, a second phase inverter M2, a first three-state gate S1 and a second three-state gate S2. An input end of the first phase inverter M1 is connected to the first clock signal end Clk1, a first control end of the first three-state gate S1, and a second control end of the second three-state gate S2, an output end of first phase inverter M1 is connected to a second control end of the first three-state gate S1 and a first control end of the second three-state gate S2. An input end of the second phase inverter M2 is connected to an output end of the first three-state gate S1, an output end of the second three-state gate S2 and the gating module P2, and an output end of the second phase inverter M2 is connected to an input end of the second three-state gate S2 and the gating module P2. An input end of the first three-state gate S1 is connected to the input signal end Input, the output end of the first three-state gate S1 is connected to output end of the second three-state gate S2 and the gating module P2, the first control end of the first three-state gate S1 is connected to the first clock signal end Clk1 and the second control end of the second three-state gate S2, and the second control end of the first three-state gate S1 is connected to the first control end of the second three-state gate S2. The input end of the second three-state gate S2 is connected to the gating module P2, the output end of the second three-state gate S2 is connected to the gating module P2, and the second control end of the second three-state gate S2 is connected to the first clock signal end Clk1.

The gating module P2 includes a first transmission gate F1, a second transmission gate F2, a third phase inverter M3, a first transistor T1, a second transistor T2 and a third transistor T3. An input end of the first transmission gate F1 is connected to the second clock signal end Clk2, an output end of the first transmission gate F1 is connected to a source electrode of the first transistor T1, an input end of the third phase inverter M3 and a first control end of the second transmission gate F2, a first control end of the first transmission gate F1 is connected to the shift register module P1, and a second control end of the first transmission gate F1 is connected to a gate electrode of the first transistor T1 and the shift register module P1. An input end of the second transmission gate F2 is connected to the touch sampling signal end TX_EN, an output end of the second transmission gate F2 is connected to a source electrode of the second transistor T2, a source electrode of the third transistor T3 and the amplification module P3, the first control end of the second transmission gate F2 is connected to the source electrode of the first transistor T1 and the input end of the third phase inverter M3, and a second control end of the second transmission gate F2 is connected to an output end of the third inverter M3 and a gate electrode of the second transistor T2. The input end of the third phase inverter M3 is connected to the source electrode of the first transistor T1, and the output end of the third phase inverter M3 is connected to the gate electrode of the second transistor T2. The gate electrode of the first transistor T1 is connected to the shift register module P1, and a drain electrode of the first transistor T1 is connected to the low level end VGL. The source electrode of the second transistor T2 is connected to the source electrode of the third transistor T3 and the amplification module P3, and a drain electrode of the second transistor T2 is connected to a drain electrode of the third transistor T3 and the low level end VGL. The source electrode of the third transistor T3 is connected to the common electrode enabling signal end VCOM_EN.

The amplification module P3 includes a fourth phase inverter M4, a fifth phase inverter M5, a sixth phase inverter M6 and a seventh phase inverter M7. An input end of the fourth phase inverter M4 is connected to the gating module P2, and an output end of the fourth phase inverter M4 is connected to an input end of the fifth phase inverter M5. An output end of the fifth phase inverter M5 is connected to an input end of the sixth phase inverter M6. An output end of the sixth phase inverter M6 is connected to an input end of the seventh phase inverter M7. The input end of the seventh phase inverter M7 is connected to the output module P4, and the output end of the seventh phase inverter M7 is connected to the output module P4.

The output module P4 includes a third transmission gate F3 and a fourth transmission gate F4. An input end of the third transmission gate F3 is connected to the touch signal end TX, an output end of the third transmission gate F3 is connected to the output end Output of the touch driving unit and an output end of the fourth transmission gate F4, a first control end of the third transmission gate F3 is connected to a second control end of the fourth transmission gate F4 and the amplification module P3, and a second control end of the third transmission gate F3 is connected to the amplification module P3. An input end of the fourth transmission gate F4 is connected to the common electrode signal end VCOM, the output end of the fourth transmission gate F4 is connected to the output end Output of the touch driving unit, a first control end of the fourth transmission gate F4 is connected to the amplification module P3, and the second control end of the fourth transmission gate F4 is connected to the amplification module P3.

A connection mode among the shift register module P1, the gating module P2, the amplification module P3 and the output module P4 will be described hereinafter.

The input end of the second phase inverter M2 is connected to the second control end of the first transmission gate F1 and the gate electrode of the first transistor T1, the output end of the second phase inverter M2 is connected to the first control end of the first transmission gate F1, the first control end of the first transmission gate F1 is connected to the input end of the second three-state gate S2, the output end of the second transmission gate F2 is connected to the input end of the fourth phase inverter M4, the source electrode of the second transistor T2 is connected to the input end of the fourth phase inverter M4, the source electrode of the third transistor T3 is connected to the input end of the fourth phase inverter M4, the input end of the seventh phase inverter is connected to the second control end of the third transmission gate F3 and the first control end of the fourth transmission gate F4.

It should be appreciated that, types of the first transistor T1, the second transistor T2, the third transistor T3 and the transistors constituting the other elements (e.g., the phase inverters, the three-state gates and the transmission gates) are not particularly defined in the embodiments of the present disclosure. In other words, they may be N-type transistors or P-type transistors. An operating principle of the touch driving unit will be described hereinafter when the first transistor T1, the second transistor T2 and the third transistor T3 are all P-type transistors. Of course, a circuit design where the transistors are N-type transistors also falls within the scope of the present disclosure.

Figure 3:
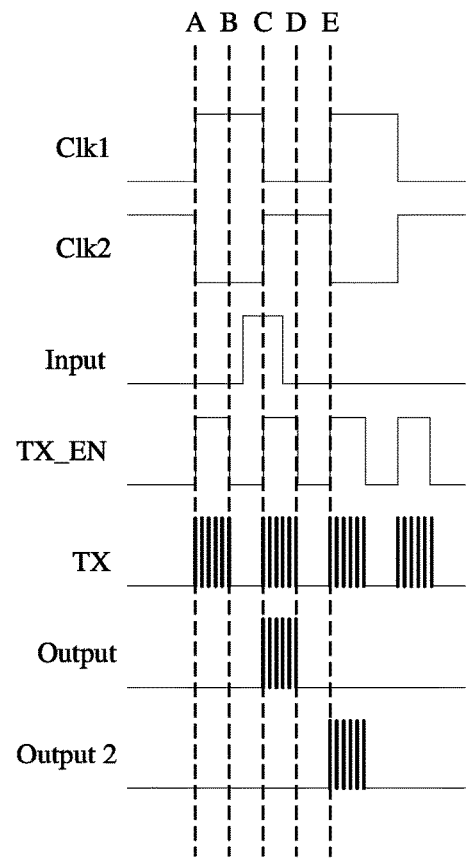
FIG. 3 is a signal sequence diagram of the touch driving unit in FIG. 2.

Referring to FIG. 3, which is a signal sequence diagram of the touch driving unit in FIG. 2, and the operating principle of the touch driving unit will be described hereinafter in association with FIG. 3.

At a stage A-B, a signal from the input signal end Input, a signal from the second clock signal end Clk2 and a signal from the touch sampling signal end TX_EN are all low level signals, a signal from the first clock signal end Clk1 is a high level signal, and a signal from the common electrode signal end VCOM is a low level signal. The high level signal from the first clock signal end Clk1 is changed into a low level signal through the first phase inverter M1, and then the low level signal is simultaneously applied to the second control end of the first three-state gate S1 and the first control end of the second three-state gate S2, so as to turn on the first three-state gate S1 and turn off the second three-state gate S2. The first three-state gate S1 outputs a high level signal to the second control end of the first transmission gate F1 and the gate electrode of the first transistor T1, and the high level signal is changed into a low level signal by the second phase inverter M2 and then the low level signal is applied to the first control end of the first transmission gate F1, so as to turn off the first transmission gate F1 and turn on the first transistor T1. A low level signal is received by the input end of the third phase inverter M3, and a high level signal is outputted by the third phase inverter M3, so as to turn off the second transmission gate F2 and turn on the second transistor T2. A low level signal from the low level end VGL is applied by the second transistor T2 sequentially to the fourth phase inverter M4, the fifth phase inverter M5, the sixth phase inverter M6 and the seventh phase inverter M7, and then the seventh phase inverter M7 outputs a low level signal to the first control end of the third transmission gate F3 and the second control end of the fourth transmission gate F4, so as to turn off the third transmission gate F3 and turn on the fourth transmission gate F4. A signal from the output end Output of the touch driving unit is identical to a signal from the common electrode signal end VCOM, i.e., a low level signal.

At a stage B-C, a signal from the first clock signal end Clk1 is a high level signal, a signal from the second clock signal end Clk2 and a signal from the touch sampling signal end TX_EN are both low level signals, and a signal from the input signal end Input is a low level signal at a first half stage and a high level signal at a second half stage. When the signal from the input signal end Input is a low level signal, an operating principle of the touch driving unit at this stage is identical to that at the stage A-B. When the signal from the input signal end Input is a high level signal, the high level signal from the first clock signal end Clk1 is changed by the first phase inverter M1 into a low level signal, and this low level signal is simultaneously applied to the second control end of the first three-state gate S1 and the first control end of the second three-state gate S2, so as to turn on the first three-state gate S1 and turn off the second three-state gate S2. The high level signal from the input signal end Input is applied to the input end of the first three-state gate S1, the first three-state gate S1 outputs a low level signal to the input end of the second phase inverter M2, the second control end of the first transmission gate F1 and the gate electrode of the first transistor T1, and then the second phase inverter M2 outputs a high level signal to the first control end of the first transmission gate F1, so as to turn on the first transmission gate F1 and turn off the first transistor T1. The first transmission gate F1 outputs a low level signal to the first control end of the second transmission gate F2 and the input end of the third phase inverter M3, and then the third phase inverter M3 outputs a high level signal to the second control end of the second transmission gate F2 and the gate electrode of the second transistor T2, so as to turn off the second transmission gate F2 and turn on the second transistor T2. A low level signal from the low level end VGL is received by the input end of the fourth transistor T4 through the second transistor T2 and applied to the fourth phase inverter M4, the fifth phase inverter M5, the sixth phase inverter M6 and the seventh phase inverter M7 outputs a low level signal to the first control end of the third transmission gate F3 and the second control end of the fourth transmission gate F4, so as to turn off the third transmission gate F3 and turn on the fourth transmission gate F4. A signal from the output end Output of the touch driving unit is identical to a signal from the common electrode signal end VCOM, i.e., a low level signal.

At a stage C-D, a signal from the first clock signal end Clk1 is a low level signal, a signal from the second clock signal end Clk2 and a signal from the touch sampling signal end TX_EN are both high level signals, and a signal from the input signal end Input is a high level signal at a first half stage and a low level signal at a second half stage. The low level signal from the first clock signal end Clk1 is received by the input end of the first phase inverter M1, and a high level signal is outputted by the first phase inverter M1 to the second control end of the first three-state gate S1 and the first control end of the second three-state gate S2, and the low level signal from the first clock signal end Clk1 is applied to the first control end of the first three-state gate S1 and the second control end of the second three-state gate S2, so as to turn off the first three-state gate S1 and turn on the second three-state gate S2. At this time, the signal from the input signal end Input, regardless of a high level signal or a low level signal, cannot be outputted by the first three-state gate S1. The input end of the second three-state gate S2 is maintained at a high level like the stage B-C, and the second three-state gate S2 outputs a low level signal to the input end of the second phase inverter M2, the gate electrode of the first transistor T1 and the second control end of the first transmission gate F1, so as to turn off the first transistor T1. The second phase inverter M2 outputs a high level signal to the first control end of the first transmission gate F1, so as to turn on the first transmission gate F1. The first transmission gate F1 then outputs a high level signal to the input end of the third phase inverter M3 and the first control end of the second transmission gate F2, and then the third phase inverter M3 outputs a low level signal to the second control end of the second transmission gate F2 and the gate electrode of the second transistor T2, so as to turn on the second transmission gate F2 and turn off the second transistor T2. The second transmission gate F2 outputs a high level signal sequentially to the fourth phase inverter M4, the fifth phase inverter M5, the sixth phase inverter M6 and the seventh phase inverter M7, and then the seventh phase inverter M7 outputs a high level signal to the first control end of the third transmission gate F3 and the second control end of the fourth transmission gate F4, so as to turn on the third transmission gate F3 and turn off the fourth transmission gate F4. A signal from the output end Output of the touch driving unit is identical to a signal from the touch signal end TX, i.e., a dense, square-wave signal.

At a stage D-E, a signal from the first clock signal end Clk1, a signal from the input signal end Input and a signal from the touch sampling signal end TX_EN are all low level signals, and a signal from the second clock signal end Clk2 is a high level signal. The input end of the first phase inverter M1 receives the low level signal from the first clock signal end Clk1, the first phase inverter M1 outputs a high level signal to the second control end of the first three-state gate S1 and the first control end of the second three-state gate S2, and the low level signal from the first clock signal end Clk1 is applied to the first control end of the first three-state gate S1 and the second control end of the second three-state gate S2, so as to turn off the first three-state gate S1 and turn on the second three-state gate S2. The input end of the second three-state gate S2 is maintained at a high level like the stage C-D, and the second three-state gate S2 outputs a low level signal to the input end of the second phase inverter M2, the gate electrode of the first transistor T1 and the second control end of the first transmission gate F1, so as to turn off the first transistor T1. The second phase inverter M2 outputs a high level signal to the first control end of the first transmission gate F1, so as to turn on the first transmission gate F1. Then, the first transmission gate F1 outputs a high level signal to the input end of the third phase inverter M3 and the first control end of the second transmission gate F2, the third phase inverter M3 outputs a low level signal to the second control end of the second transmission gate F2, and the second transmission gate F2 outputs a signal identical to a signal from the touch sampling signal end TX_EN, i.e., a low level signal, sequentially to the fourth phase inverter M4, the fifth phase inverter M5, the sixth phase inverter M6 and the seventh phase inverter M7. The seventh phase inverter M7 then outputs a low level signal to the first control end of the third transmission gate F3 and the second control end of the fourth transmission gate F4, so as to turn off the third transmission gate F3 and turn on the fourth transmission gate F4. A signal from the output end Output of the touch driving unit is identical to a signal from the common electrode signal end VCOM, i.e., a low level signal.

Figure 4:
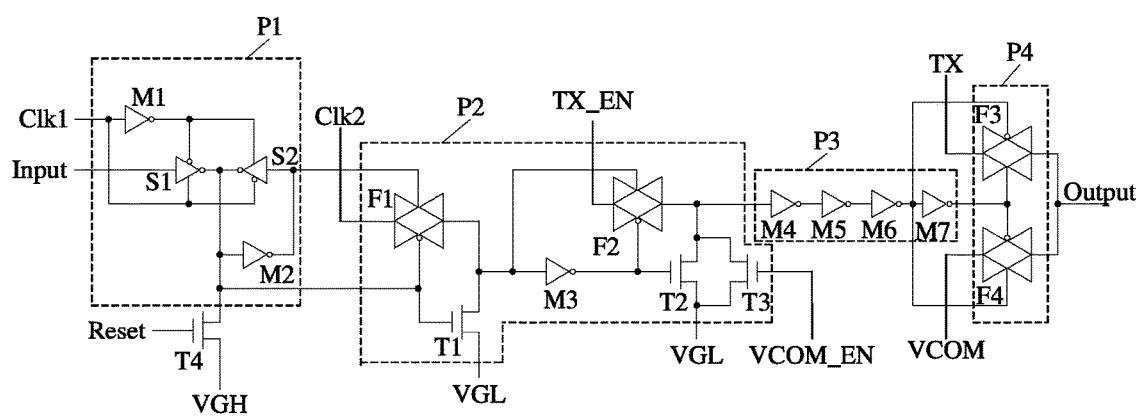
FIG. 4 is yet another schematic view showing the touch driving unit according to at least one embodiment of the present disclosure.

Referring to FIG. 4, on the basis of FIG. 2, the touch driving unit further includes a fourth transistor T4, a gate electrode of the fourth transistor T4 is connected to a reset signal end, a source electrode of the fourth transistor T4 is connected to the input end of the first phase inverter M1, the output end of the first three-state gate S1, the output end of the second three-state gate S2, the second control end of the first transmission gate F1 and the gate electrode of the first transistor T1, and a drain electrode of the fourth transistor T4 is connected to a high level end.

An operating principle of the fourth transistor T4 will be described hereinafter by taking a P-type transistor as an example. When a signal from the reset signal end Reset is a high level signal, the fourth transistor T4 is turned on, and a high level signal from the high level end VGH is applied by the fourth transistor T4 to the second control end of the first transmission gate F1 and the gate electrode of the first transistor T1, so as to turn off the first transmission gate F1 and turn on the first transistor T1. A signal from the output end of the third phase inverter M3 is a high level signal, so the second transmission gate F2 is turned off and the second transistor T2 is turned on. A signal from the input end of the fourth phase inverter M4 is a low level signal, and the seventh phase inverter M7 outputs a low level signal, so as to turn off the third transmission gate F3 and turn on the fourth transmission gate F4. At this time, the output end Output of the touch driving unit outputs a low level signal. As a result, when the signal from the reset signal end Reset is a high level signal, the output end Output of the touch driving unit outputs a low level signal all the time, so as to achieve a resetting operation.

Figure 5:
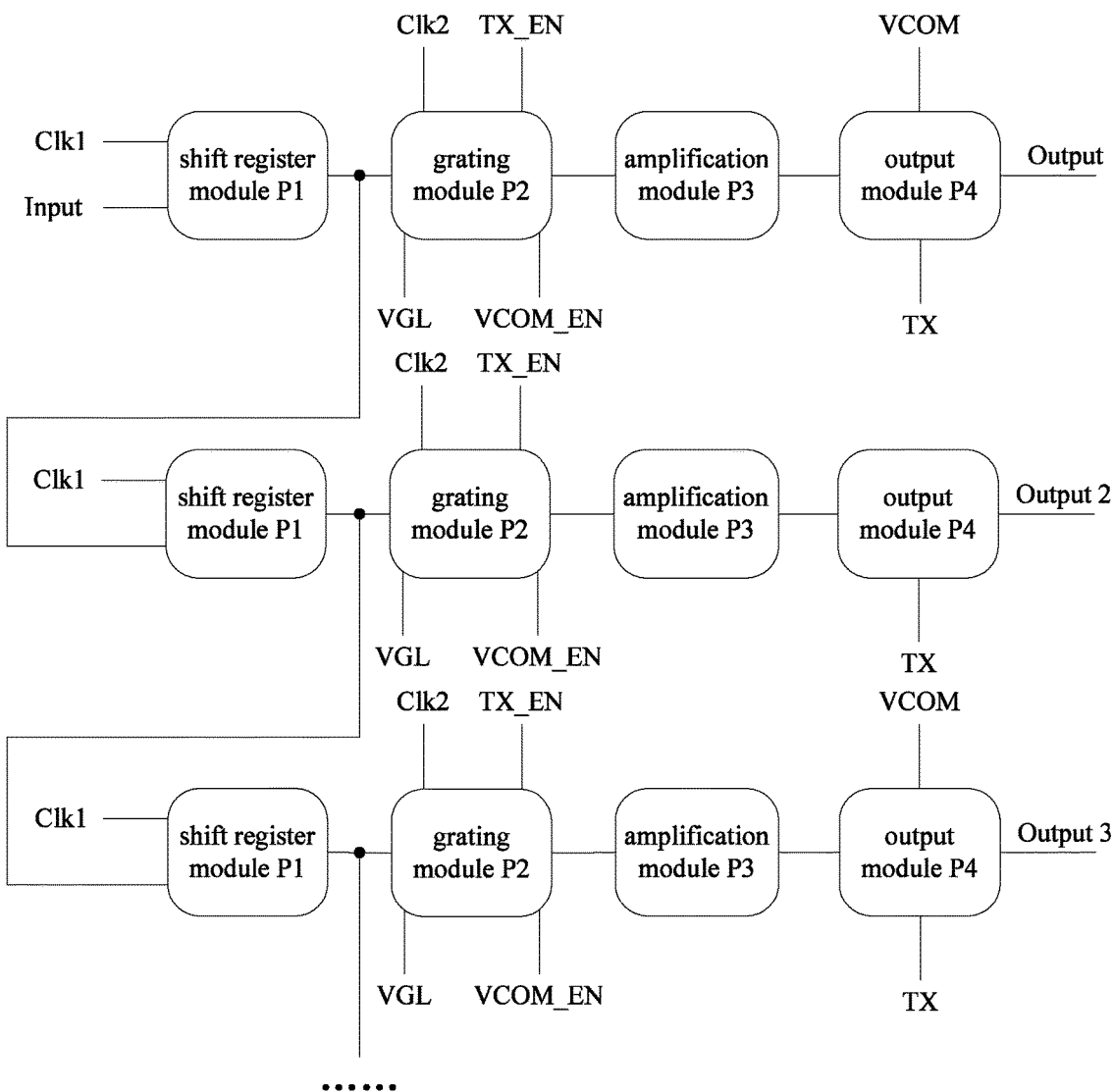
FIG. 5 is a schematic view showing a connection mode of multiple levels of the touch driving units according to at least one embodiments of the present disclosure.

The present disclosure further provides in some embodiments a touch panel including multiple levels of the touch driving units in FIGS. 1, 2 and 4. Referring to FIG. 5, the output end of the shift register module P1 in a preceding-level touch driving unit is connected to the input signal end of a current-level touch driving unit, and the output end of the shift register module P1 in a first-level touch driving unit is connected to the input signal end of a second-level touch driving unit. Through this design, it is able for the signal from the output end of the preceding-level touch driving unit to be shifted from the signal from the output end of the current-level touch driving unit. As shown in FIG. 3, the signal from the output end Output of the first-level touch driving unit is shifted from the signal from the output end Output 2 of the second-level touch driving unit.

It should be appreciated that, the touch driving unit in the touch panel has the same advantages as that mentioned in the above embodiments, and these advantages will not be repeated herein.

The present disclosure further provides in some embodiments a display device including the above-mentioned touch panel in FIG. 5. The touch panel in the display device has the same advantages as that mentioned in the above embodiments, and thus will not be repeated herein. To be specific, the display device may be any product or member having a display function, such as an organic light-emitting diode display panel, a liquid crystal display panel, an electronic paper, a mobile phone, a flat-panel computer, a television, a display, a laptop computer, a digital photo frame or a navigator.

The above-mentioned features, structures, materials or characteristics may be combined in an appropriate manner in one or more embodiments.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A touch driving unit, comprising:
a shift register module, wherein an input end of the shift register module is connected to a first clock signal end and an input signal end, an output end of the shift register module is connected to a gating module, and the shift register module is configured to generate a triggering signal;
the gating module, wherein an input end of the gating module is connected to a second clock signal end, a touch sampling signal end, a common electrode enabling signal end, a low level end and the shift register module, an output end of the gating module is connected to an amplification module, and the gating module is configured to generate a control signal in accordance with the triggering signal so as to control a signal outputted from an output module;
the amplification module, wherein an input end of the amplification module is connected to the gating module, an output end of the amplification module is connected to the output module, and the amplification module is configured to amplify the control signal; and
the output module, wherein an input end of the output module is connected to a touch signal end and a common electrode signal end, an output end of the output module is connected to an output end of the touch driving unit, and the output module is configured to output a signal from the touch signal end or a signal from the common electrode signal end.

2. The touch driving unit according to claim 1, wherein the shift register module comprises a first phase inverter, a second phase inverter, a first three-state gate and a second three-state gate, wherein
an input end of the first phase inverter is connected to the first clock signal end, a first control end of the first three-state gate and a second control end of the second three-state gate, an output end of the first phase inverter is connected to a second control end of the first three-state gate and a first control end of the second three-state gate;
an input end of the second phase inverter is connected to an output end of the first three-state gate, an output end of the second three-state gate and the gating module, and an output end of the second phase inverter is connected to an input end of the second three-state gate and the gating module;
an input end of the first three-state gate is connected to the input signal end, the output end of the first three-state gate is connected to output end of the second three-state gate and the gating module, the first control end of the first three-state gate is connected to the first clock signal end and the second control end of the second three-state gate, and the second control end of the first three-state gate is connected to the first control end of the second three-state gate; and
the input end of the second three-state gate is connected to the gating module, the output end of the second three-state gate is connected to the gating module, and the second control end of the second three-state gate is connected to the first clock signal end.

3. The touch driving unit according to claim 2, wherein the gating module includes a first transmission gate, a second transmission gate, a third phase inverter, a first transistor, a second transistor and a third transistor, wherein
an input end of the first transmission gate is connected to the second clock signal end, an output end of the first transmission gate is connected to a source electrode of the first transistor, an input end of the third phase inverter and a first control end of the second transmission gate, a first control end of the first transmission gate is connected to the shift register module, and a second control end of the first transmission gate is connected to a gate electrode of the first transistor and the shift register module;
an input end of the second transmission gate is connected to the touch sampling signal end, an output end of the second transmission gate is connected to a source electrode of the second transistor, a source electrode of the third transistor and the amplification module, the first control end of the second transmission gate is connected to the source electrode of the first transistor and the input end of the third phase inverter, and a second control end of the second transmission gate is connected to an output end of the third inverter and a gate electrode of the second transistor;
the input end of the third phase inverter is connected to the source electrode of the first transistor, and the output end of the third phase inverter is connected to the gate electrode of the second transistor;
the gate electrode of the first transistor is connected to the shift register module, and a drain electrode of the first transistor is connected to the low level end;
the source electrode of the second transistor is connected to the source electrode of the third transistor and the amplification module, and a drain electrode of the second transistor is connected to a drain electrode of the third transistor and the low level end; and
the source electrode of the third transistor is connected to the common electrode enabling signal end.

4. The touch driving unit according to claim 3, wherein the amplification module comprises a fourth phase inverter, a fifth phase inverter, a sixth phase inverter and a seventh phase inverter, wherein an input end of the fourth phase inverter is connected to the gating module, and an output end of the fourth phase inverter is connected to an input end of the fifth phase inverter;

an output end of the fifth phase inverter is connected to an input end of the sixth phase inverter;

an output end of the sixth phase inverter is connected to an input end of the seventh phase inverter; and the input end of the seventh phase inverter is connected to the output module, and the output end of the seventh phase inverter is connected to the output module.

5. The touch driving unit according to claim 4, wherein the output module comprises a third transmission gate and a fourth transmission gate, wherein an input end of the third transmission gate is connected to the touch signal end, an output end of the third transmission gate is connected to the output end of the touch driving unit and an output end of the fourth transmission gate, a first control end of the third transmission gate is connected to a second control end of the fourth transmission gate and the amplification module, and a second control end of the third transmission gate is connected to the amplification module; and an input end of the fourth transmission gate is connected to the common electrode signal end, the output end of the fourth transmission gate is connected to the output end of the touch driving unit, a first control end of the fourth transmission gate is connected to the amplification module, and the second control end of the fourth transmission gate is connected to the amplification module.

6. The touch driving unit according to claim 5, wherein the input end of the second phase inverter is connected to the second control end of the first transmission gate and the gate electrode of the first transistor, and the output end of the second phase inverter is connected to the first control end of the first transmission gate;

the first control end of the first transmission gate is connected to the input end of the second three-state gate;

the output end of the second transmission gate is connected to the input end of the fourth phase inverter;

the source electrode of the second transistor is connected to the input end of the fourth phase inverter;

the source electrode of the third transistor is connected to the input end of the fourth phase inverter; and the input end of the seventh phase inverter is connected to the second control end of the third transmission gate and the first control end of the fourth transmission gate.

7. The touch driving unit according to claim 5, wherein the input end of the second phase inverter is connected to the second control end of the first transmission gate and the gate electrode of the first transistor, and the output end of the second phase inverter is connected to the first control end of the first transmission gate;

the first control end of the first transmission gate is connected to the input end of the second three-state gate;

the output end of the second transmission gate is connected to the input end of the fourth phase inverter;

the source electrode of the second transistor is connected to the input end of the fourth phase inverter;

the source electrode of the third transistor is connected to the input end of the fourth phase inverter; and the input end of the seventh phase inverter is connected to the second control end of the third transmission gate and the first control end of the fourth transmission gate.

8. The touch driving unit according to claim 5, wherein the input end of the second phase inverter is connected to the second control end of the first transmission gate and the gate electrode of the first transistor, and the output end of the second phase inverter is connected to the first control end of the first transmission gate;

the first control end of the first transmission gate is connected to the input end of the second three-state gate;

the output end of the second transmission gate is connected to the input end of the fourth phase inverter;

the source electrode of the second transistor is connected to the input end of the fourth phase inverter;

the source electrode of the third transistor is connected to the input end of the fourth phase inverter; and the input end of the seventh phase inverter is connected to the second control end of the third transmission gate and the first control end of the fourth transmission gate.

9. The touch driving unit according to claim 5, wherein the input end of the second phase inverter is connected to the second control end of the first transmission gate and the gate electrode of the first transistor, and the output end of the second phase inverter is connected to the first control end of the first transmission gate;

the first control end of the first transmission gate is connected to the input end of the second three-state gate;

the output end of the second transmission gate is connected to the input end of the fourth phase inverter;

the source electrode of the second transistor is connected to the input end of the fourth phase inverter;

the source electrode of the third transistor is connected to the input end of the fourth phase inverter; and the input end of the seventh phase inverter is connected to the second control end of the third transmission gate and the first control end of the fourth transmission gate.

10. The touch driving unit according to claim 3, further comprising a fourth transistor, a gate electrode of the fourth transistor is connected to a reset signal end, a source electrode of the fourth transistor is connected to the input end of the first phase inverter, the output end of the first three-state gate, the output end of the second three-state gate, the second control end of the first transmission gate and the gate electrode of the first transistor, and a drain electrode of the fourth transistor is connected to a high level end.

11. The touch driving unit according to claim 3, wherein the first transistor, the second transistor and the third transistor are all N-type transistors or P-type transistors.

12. The touch driving unit according to claim 1, wherein the shift register module comprises a first phase inverter, a second phase inverter, a first three-state gate and a second three-state gate, wherein an input end of the first phase inverter is connected to the first clock signal end, a first control end of the first three-state gate and a second control end of the second three-state gate, an output end of the first phase inverter is connected to a second control end of the first three-state gate and a first control end of the second three-state gate;

an input end of the second phase inverter is connected to an output end of the first three-state gate, an output end of the second three-state gate and the gating module, and an output end of the second phase inverter is connected to an input end of the second three-state gate and the gating module;

an input end of the first three-state gate is connected to the input signal end, the output end of the first three-state gate is connected to output end of the second three-state gate and the gating module, the first control end of the first three-state gate is connected to the first clock signal end and the second control end of the second three-state gate, and the second control end of the first three-state gate is connected to the first control end of the second three-state gate; and the input end of the second three-state gate is connected to the gating module, the output end of the second three-state gate is connected to the gating module, and the second control end of the second three-state gate is connected to the first clock signal end, the gating module includes a first transmission gate, a second transmission gate, a third phase inverter, a first transistor, a second transistor and a third transistor, wherein an input end of the first transmission gate is connected to the second clock signal end, an output end of the first transmission gate is connected to a source electrode of the first transistor, an input end of the third phase inverter and a first control end of the second transmission gate, a first control end of the first transmission gate is connected to the shift register module, and a second control end of the first transmission gate is connected to a gate electrode of the first transistor and the shift register module;

an input end of the second transmission gate is connected to the touch sampling signal end, an output end of the second transmission gate is connected to a source electrode of the second transistor, a source electrode of the third transistor and the amplification module, the first control end of the second transmission gate is connected to the source electrode of the first transistor and the input end of the third phase inverter, and a second control end of the second transmission gate is connected to an output end of the third inverter and a gate electrode of the second transistor;

the input end of the third phase inverter is connected to the source electrode of the first transistor, and the output end of the third phase inverter is connected to the gate electrode of the second transistor;

the gate electrode of the first transistor is connected to the shift register module, and a drain electrode of the first transistor is connected to the low level end;

the source electrode of the second transistor is connected to the source electrode of the third transistor and the amplification module, and a drain electrode of the second transistor is connected to a drain electrode of the third transistor and the low level end; and the source electrode of the third transistor is connected to the common electrode enabling signal end, and the amplification module comprises a fourth phase inverter, a fifth phase inverter, a sixth phase inverter and a seventh phase inverter, wherein an input end of the fourth phase inverter is connected to the gating module, and an output end of the fourth phase inverter is connected to an input end of the fifth phase inverter;

an output end of the fifth phase inverter is connected to an input end of the sixth phase inverter;

an output end of the sixth phase inverter is connected to an input end of the seventh phase inverter; and the input end of the seventh phase inverter is connected to the output module, and the output end of the seventh phase inverter is connected to the output module, and the output module comprises a third transmission gate and a fourth transmission gate;

an input end of the third transmission gate is connected to the touch signal end, an output end of the third transmission gate is connected to the output end of the touch driving unit and an output end of the fourth transmission gate, a first control end of the third transmission gate is connected to a second control end of the fourth transmission gate and the amplification module, and a second control end of the third transmission gate is connected to the amplification module; and an input end of the fourth transmission gate is connected to the common electrode signal end, the output end of the fourth transmission gate is connected to the output end of the touch driving unit, a first control end of the fourth transmission gate is connected to the amplification module, and the second control end of the fourth transmission gate is connected to the amplification module.

13. A touch panel, comprising multiple levels of touch driving units, and each of the touch driving units is the touch driving unit according to claim 1.

14. The touch panel according to claim 13, wherein the shift register module comprises a first phase inverter, a second phase inverter, a first three-state gate and a second three-state gate, wherein an input end of the first phase inverter is connected to the first clock signal end, a first control end of the first three-state gate and a second control end of the second three-state gate, an output end of the first phase inverter is connected to a second control end of the first three-state gate and a first control end of the second three-state gate;

an input end of the second phase inverter is connected to an output end of the first three-state gate, an output end of the second three-state gate and the gating module, and an output end of the second phase inverter is connected to an input end of the second three-state gate and the gating module;

an input end of the first three-state gate is connected to the input signal end, the output end of the first three-state gate is connected to output end of the second three-state gate and the gating module, the first control end of the first three-state gate is connected to the first clock signal end and the second control end of the second three-state gate, and the second control end of the first three-state gate is connected to the first control end of the second three-state gate; and the input end of the second three-state gate is connected to the gating module, the output end of the second three-state gate is connected to the gating module, and the second control end of the second three-state gate is connected to the first clock signal end.

15. The touch panel according to claim 14, wherein the gating module includes a first transmission gate, a second transmission gate, a third phase inverter, a first transistor, a second transistor and a third transistor, wherein an input end of the first transmission gate is connected to the second clock signal end, an output end of the first transmission gate is connected to a source electrode of the first transistor, an input end of the third phase inverter and a first control end of the second transmission gate, a first control end of the first transmission gate is connected to the shift register module, and a second control end of the first transmission gate is connected to a gate electrode of the first transistor and the shift register module;

an input end of the second transmission gate is connected to the touch sampling signal end, an output end of the second transmission gate is connected to a source electrode of the second transistor, a source electrode of the third transistor and the amplification module, the first control end of the second transmission gate is connected to the source electrode of the first transistor and the input end of the third phase inverter, and a second control end of the second transmission gate is connected to an output end of the third inverter and a gate electrode of the second transistor;

the input end of the third phase inverter is connected to the source electrode of the first transistor, and the output end of the third phase inverter is connected to the gate electrode of the second transistor;

the gate electrode of the first transistor is connected to the shift register module, and a drain electrode of the first transistor is connected to the low level end;

the source electrode of the second transistor is connected to the source electrode of the third transistor and the amplification module, and a drain electrode of the second transistor is connected to a drain electrode of the third transistor and the low level end; and the source electrode of the third transistor is connected to the common electrode enabling signal end.

16. The touch panel according to claim 15, wherein the amplification module comprises a fourth phase inverter, a fifth phase inverter, a sixth phase inverter and a seventh phase inverter, wherein an input end of the fourth phase inverter is connected to the gating module, and an output end of the fourth phase inverter is connected to an input end of the fifth phase inverter;

an output end of the fifth phase inverter is connected to an input end of the sixth phase inverter;

an output end of the sixth phase inverter is connected to an input end of the seventh phase inverter; and the input end of the seventh phase inverter is connected to the output module, and the output end of the seventh phase inverter is connected to the output module.

17. The touch panel according to claim 16, wherein the output module comprises a third transmission gate and a fourth transmission gate, wherein an input end of the third transmission gate is connected to the touch signal end, an output end of the third transmission gate is connected to the output end of the touch driving unit and an output end of the fourth transmission gate, a first control end of the third transmission gate is connected to a second control end of the fourth transmission gate and the amplification module, and a second control end of the third transmission gate is connected to the amplification module; and an input end of the fourth transmission gate is connected to the common electrode signal end, the output end of the fourth transmission gate is connected to the output end of the touch driving unit, a first control end of the fourth transmission gate is connected to the amplification module, and the second control end of the fourth transmission gate is connected to the amplification module.

18. The touch panel according to claim 17, wherein the input end of the second phase inverter is connected to the second control end of the first transmission gate and the gate electrode of the first transistor, and the output end of the second phase inverter is connected to the first control end of the first transmission gate;

the first control end of the first transmission gate is connected to the input end of the second three-state gate;

the output end of the second transmission gate is connected to the input end of the fourth phase inverter;

the source electrode of the second transistor is connected to the input end of the fourth phase inverter;

the source electrode of the third transistor is connected to the input end of the fourth phase inverter; and the input end of the seventh phase inverter is connected to the second control end of the third transmission gate and the first control end of the fourth transmission gate.

19. The touch panel according to claim 13, wherein in the multiple levels of touch driving units, apart from a last-level touch driving unit, an output end of the shift register module in each level of touch driving unit is connected to an input signal end of a succeeding-level touch driving unit.

20. A display device, comprising the touch panel according to claim 13.

* * * * *